United States Patent
Park

(10) Patent No.: US 10,336,895 B2
(45) Date of Patent: Jul. 2, 2019

(54) RUBBER BLEND COMPOSITION HAVING IMPROVED FREEZING RESISTANCE WITH FLUOROCARBON RUBBER AND METHOD OF PREPARING THE SAME

(71) Applicants: Hyundai Motor Company, Seoul (KR); Kia Motors Corporation, Seoul (KR)

(72) Inventor: Jong Min Park, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 59 days.

(21) Appl. No.: 15/792,565

(22) Filed: Oct. 24, 2017

(65) Prior Publication Data

US 2018/0334562 A1    Nov. 22, 2018

(30) Foreign Application Priority Data

May 18, 2017    (KR) .................. 10-2017-0061331

(51) Int. Cl.
| | |
|---|---|
| *C08L 9/00* | (2006.01) |
| *C08L 27/16* | (2006.01) |
| *C08L 27/18* | (2006.01) |
| *C08L 27/20* | (2006.01) |
| *C08L 31/04* | (2006.01) |
| *C08L 15/00* | (2006.01) |
| *C08L 23/16* | (2006.01) |

(52) U.S. Cl.
CPC .................. *C08L 27/16* (2013.01); *C08L 9/00* (2013.01); *C08L 15/005* (2013.01); *C08L 23/16* (2013.01); *C08L 27/18* (2013.01); *C08L 27/20* (2013.01); *C08L 31/04* (2013.01)

(58) Field of Classification Search
CPC ........ C08L 27/20; C08L 31/04; C08L 15/005; C08L 27/18; C08L 9/00; C08L 27/16; C08L 23/16
See application file for complete search history.

(56) References Cited

U.S. PATENT DOCUMENTS 9,371,434 B2 *    6/2016    Pan et al. ............. C08K 5/0091

FOREIGN PATENT DOCUMENTS

KR    10-2015-0120323 A    10/2015

* cited by examiner

*Primary Examiner* — Nathan M Nutter
(74) *Attorney, Agent, or Firm* — Morgan, Lewis & Bockius LLP

(57) ABSTRACT

A rubber blend composition having improved freezing resistance, may include about 20 wt % to about 50 wt % of a fluorocarbon rubber having a radicalized end group on a fluoroalkylene backbone; and about 50 wt % to about 80 wt % of a synthetic rubber.

18 Claims, No Drawings

RUBBER BLEND COMPOSITION HAVING IMPROVED FREEZING RESISTANCE WITH FLUOROCARBON RUBBER AND METHOD OF PREPARING THE SAME

CROSS-REFERENCE TO RELATED APPLICATION

The present application claims priority to Korean Patent Application No. 10-2017-0061331 filed on May 18, 2017, the entire contents of which is incorporated herein for all purposes by this reference.

BACKGROUND OF THE INVENTION

Field of the Invention

The present invention relates to a rubber blend composition having superior freezing resistance, which is configured such that fluorocarbon rubber and synthetic rubber are mixed together.

Description of Related art

An oil seal is a sealing component configured to prevent oil, such as lubricating oil, operating oil, etc., cooling water, or grease from leaking from various machines.

Such an oil seal is mainly used in the state of being in contact with the rotating shaft in a machine. Thus, a rubber composition for the oil seal has to exhibit superior heat resistance, oil resistance and wear resistance.

As for the rubber composition for the oil seal, fluorocarbon rubber (FKM) is receiving attention because fluorocarbon rubber (FKM) manifests excellent heat resistance, chemical resistance, oil resistance, ozone resistance, and weatherability.

Recently, problems such as oil leakage and oil seal breakage have occurred in severely cold places, such as Russia, North America including Canada, and the like, and thus, the demand for a rubber composition having high freezing resistance is increasing. A rubber material may typically undergo phase transformation at a temperature equal to or lower than a glass transition temperature thereof, thus losing the intrinsic elasticity of the rubber material, and may become unable to exhibit air tightness or break due to the load thereof.

In order to use fluorocarbon rubber, typically having poor freezing resistance, at low temperatures, the fluorocarbon rubber has to be processed so as to increase freezing resistance through predetermined treatment such as crosslinking with peroxide, as disclosed in Korean Patent Application Publication No. 10-2015-0120323. Here, the manufacturing costs (fluorocarbon rubber having a glass transition temperature of −30° C.: price 200,000 won/kg) are remarkably increased. Hence, a very large burden is imposed on the use of very expensive fluorocarbon rubber suitable for use at low temperatures in order to ensure a single property, such as freezing resistance.

The information disclosed in this Background of the Invention section is only for enhancement of understanding of the general background of the invention and may not be taken as an acknowledgement or any form of suggestion that this information forms the prior art already known to a person skilled in the art.

SUMMARY OF THE INVENTION

Various aspects of the present invention are directed to providing a rubber blend composition, which is inexpensive and exhibits superior freezing resistance, in lieu of very expensive fluorocarbon rubber for use at low temperatures.

The aspect of the present invention is not limited to the foregoing, and will be able to be clearly understood through the following description and to be realized by the means described in the claims and combinations thereof.

The present invention provides a rubber blend composition having improved freezing resistance. The composition comprises: about 20 wt % to about 50 wt % of fluorocarbon rubber having a radicalized end group on a fluoroalkylene backbone and about 50 wt % to about 80 wt % of synthetic rubber.

In some embodiments of the present invention, the fluorocarbon rubber and the synthetic rubber may be cross-linked.

In other embodiments of the present invention, the fluorocarbon rubber may be selected from the group consisting of vinylidene fluoride (VF), hexafluoropropylene (HFP), tetrafluoroethylene (TFE), perfluoromethylvinylether (PMVE), and combinations thereof.

In certain embodiments of the present invention, the fluorocarbon rubber may be selected from the group consisting of a binary copolymer of vinylidene fluoride (VF) and hexafluoropropylene (HFP); a tertiary copolymer of vinylidene fluoride (VF), tetrafluoroethylene (TFE) and perfluoromethylvinylether (PMVE); a tertiary copolymer of vinylidene fluoride (VF), hexafluoropropylene (HFP) and tetrafluoroethylene (TFE); and combinations thereof.

In some embodiments of the present invention, the fluorocarbon rubber may contain about 65 wt % to about 70 wt % of fluorine.

In certain embodiments of the present invention, the synthetic rubber may be selected from the group consisting of hydrogenated nitrile butadiene rubber (HNBR), nitrile butadiene rubber (NBR), an ethylene-propylene-diene-monomer (EPDM), acrylate rubber (ACM), acrylate ethylene rubber (AEM), an ethylene-vinyl acetate (EVA) copolymer and combinations thereof.

In other embodiments of the present invention, the rubber blend composition may further comprise, based on a total of 100 parts by weight of the fluorocarbon rubber and the synthetic rubber, about 20 parts by weight to about 40 parts by weight of a filler.

In some embodiments of the present invention, the rubber blend composition may further comprise a crosslinking agent and an additive selected from the group consisting of an antioxidant, an activator, a crosslinking accelerator and combinations thereof.

In some embodiments of the present invention, the rubber blend composition may have a TR-10 of −25° C. to −30° C. in accordance with ASTM D1329.

In addition, the present invention provides a method of preparing a rubber blend composition having improved freezing resistance. The method comprises (1) irradiating fluorocarbon rubber having a fluoroalkylene backbone with a microwave, thus radicalizing the end group of the fluorocarbon rubber, (2) mixing about 20 wt % to about 50 wt % of the fluorocarbon rubber irradiated with the microwave and about 50 wt % to about 80 wt % of synthetic rubber, and (3) crosslinking the fluorocarbon rubber and the synthetic rubber.

In a preferred embodiment of the present invention, the irradiating with the microwave may be performed by applying a microwave of about 600 W to about 800 W to the fluorocarbon rubber for about 1 min to about 10 min.

According to the present invention, a rubber blend composition, which is inexpensive and exhibits superior freezing resistance, can be provided, and thus the price of products using the same can be remarkably decreased, thereby obtaining market competitiveness.

The effects of the present invention are not limited to the foregoing, and should be understood to incorporate all effects that can be reasonably inferred from the following description.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a detailed description will be given of embodiments of the present invention. The embodiments of the present invention may be variously modified without changing the gist thereof, but are not to be construed as limiting the scope of the present invention.

In the following description of the present invention, it is to be noted that a detailed description of related known functions or constructions will be omitted when it would make the gist of the present disclosure unclear. As used herein, the term "includes" means that it may further include other components unless otherwise mentioned.

The present invention addresses a rubber blend composition having improved freezing resistance, in which fluorocarbon rubber having a radicalized end group on a fluoroalkylene backbone and synthetic rubber having good low-temperature properties are crosslinked.

For reference, as used herein, the term "blend composition" refers to a composition in which ingredients thereof are not simply mixed, but are crosslinked with each other.

As used herein, the fluorocarbon rubber contained in the rubber blend composition according to the present invention may be referred to as "fluorocarbon rubber" and "fluorocarbon rubber having a radicalized end group on a fluoroalkylene backbone". This is because the latter term is rather too long to use repeatedly. Whether the term "fluorocarbon rubber" indicates fluorocarbon rubber having the radicalized end group contained in the rubber blend composition of the present invention or typical fluorocarbon rubber may be clearly understood through the context of use of each term, and will not be confused by ordinary technicians.

Typically, fluorocarbon rubber (FKM) has a very high polymer content of 70% to 75% and high binding energy of a main chain and a crosslinking portion, making it difficult to prepare a blend composition using different rubber materials.

Conventionally, in order to increase the freezing resistance of the fluorocarbon rubber, an additive such as a plasticizer may be added, rather than another rubber material. However, when a plasticizer is added to the rubber material, the glass transition temperature may decrease, but properties such as heat resistance or oil resistance may become poor. This is because the plasticizer forcibly expands the molecular chain of the rubber material to thus lower binding energy.

Furthermore, attempts have been made to crosslink the fluorocarbon rubber with peroxide to increase freezing resistance, but the manufacturing costs may be drastically increased, making it difficult to actually use it for industrial applications.

Therefore, in the present invention, the rubber blend composition having improved freezing resistance is configured such that the fluorocarbon rubber and the synthetic rubber having high freezing resistance are crosslinked, and specifically, the end group of the fluorocarbon rubber is radicalized and is then crosslinked with the synthetic rubber, thus overcoming the limitations of use of the fluorocarbon rubber and obtaining a rubber blend composition having improved freezing resistance at low cost.

In the present invention, the fluorocarbon rubber is irradiated with a microwave so as to form fluorocarbon rubber having a radicalized end group on a fluoroalkylene backbone, and thus the end group of the fluorocarbon rubber is activated by the energy of the microwave to thus drastically increase reactivity, whereby the fluorocarbon rubber is crosslinked with the synthetic rubber, thus yielding the rubber blend composition.

In the present invention, the fluorocarbon rubber is added with the synthetic rubber having good low-temperature properties to thus provide a rubber blend composition having superior freezing resistance, but the process of blending the fluorocarbon rubber having the radicalized end group with another rubber material may also be used as original technology for improving the physical and chemical properties of the fluorocarbon rubber.

The fluorocarbon rubber is a hydrocarbon polymer having a high degree of fluorination, and functions to ensure superior mechanical properties and heat resistance of the rubber blend composition. The fluorocarbon rubber may be selected from the group consisting of vinylidene fluoride (VF), hexafluoropropylene (HFP), tetrafluoroethylene (TFE), perfluoromethylvinylether (PMVE) and combinations thereof, and is preferably composed of binary or tertiary copolymers thereof. More preferably, it is selected from the group consisting of a binary copolymer of vinylidene fluoride (VF) and hexafluoropropylene (HFP); a tertiary copolymer of vinylidene fluoride (VF), tetrafluoroethylene (TFE) and perfluoromethylvinylether (PMVE); a tertiary copolymer of vinylidene fluoride (VF), hexafluoropropylene (HFP) and tetrafluoroethylene (TFE); and combinations thereof. The fluorocarbon rubber includes a total fluorine content of about 65 wt % or more, and in some cases about 65 wt % to about 70 wt % (e.g., about 65 wt %, about 66 wt %, about 67 wt %, about 68 wt %, about 69 wt %, or about 70 wt %).

The synthetic rubber functions to ensure superior freezing resistance of the rubber blend composition and price competitiveness thereof. The synthetic rubber may be selected from the group consisting of hydrogenated nitrile butadiene rubber (HNBR), nitrile butadiene rubber (NBR), an ethylene-propylene-diene-monomer (EPDM), acrylate rubber (ACM), acrylate ethylene rubber (AEM), an ethylene-vinyl acetate (EVA) copolymer and combinations thereof.

The rubber blend composition may include about 20 wt % to about 50 wt % (e.g., about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 40 wt %, about 41 wt %, about 42 wt %, about 43 wt %, about 44 wt %, about 45 wt %, about 46 wt %, about 47 wt %, about 48 wt %, about 49 wt %, or about 50 wt %) of the fluorocarbon rubber having the radicalized end group on the fluoroalkylene backbone and 50 wt % to 80 wt % (e.g., about 50 wt %, about 51 wt %, about 52 wt %, about 53 wt %, about 54 wt %, about 55 wt %, about 56 wt %, about 57 wt %, about 58 wt %, about 59 wt %, about 60 wt %, about 61 wt %, about 62 wt %, about 63 wt %, about 64 wt %, about 65 wt %, about 66 wt %, about 67 wt %, about 68 wt %, about 69 wt %, about 70 wt %, about 71 wt %, about 72 wt %, about 73 wt %, about 74 wt %, about 75 wt %, about 76 wt %, about 77 wt %, about 78 wt %, about 79 wt %, or about 80 wt %) of the synthetic rubber. If the amount of the fluorocarbon rubber exceeds 50 wt %, the rubber blend composition may not be formed. On the other hand, if the amount thereof is less than 20 wt %, the mechanical properties of the rubber blend composition may deteriorate.

The rubber blend composition may further include a filler. The filler functions to enhance hardness and mechanical properties, and may include, but is not limited to, carbon black having a grade of HAF (High Abrasion Furnace), FEF (Fast Extrusion Furnace), SAF (Super Abrasion Furnace), ISAF (Intermediate Super Abrasion Furnace), or GPF (General Purpose Furnace). Also, clay having a layered structure may be used alone or in combination with carbon black.

The rubber blend composition may include, based on a total of 100 parts by weight of the fluorocarbon rubber and the synthetic rubber, 20 parts by weight to 40 parts by weight (e.g., 20 parts by weight, 21 parts by weight, 22 parts by weight, 23 parts by weight, 24 parts by weight, 25 parts by weight, 26 parts by weight, 27 parts by weight, 28 parts by weight, 29 parts by weight, 30 parts by weight, 31 parts by weight, 32 parts by weight, 33 parts by weight, 34 parts by weight, 35 parts by weight, 36 parts by weight, 37 parts by weight, 38 parts by weight, 39 parts by weight, or 40 parts by weight) of the filler. If the amount of the filler is less than 20 parts by weight, the enhancement of hardness and mechanical properties may become insignificant. On the other hand, if the amount thereof exceeds 40 parts by weight, low efficiency may arise due to the effects being marginal despite the increased addition thereof.

The rubber blend composition may further include a crosslinking agent. The crosslinking agent functions to crosslink the fluorocarbon rubber and the synthetic rubber, and any crosslinking agent may be used so long as it is typically useful in polymer fields. It may be exemplified by sulfur.

The rubber blend composition may further include an additive selected from the group consisting of an antioxidant, an activator, a crosslinking accelerator and combinations thereof. However, the prevent invention is not limited thereto, and any additive may be used so long as it is able to improve or enhance the properties of the rubber composition.

In addition, the present invention provides a method of preparing the rubber blend composition having improved freezing resistance. The method includes the following steps: (1) irradiating fluorocarbon rubber having a fluoroalkylene backbone with a microwave to thus radicalize the end group of the fluorocarbon rubber, (2) mixing about 20 wt % to about 50 wt % of the fluorocarbon rubber irradiated with the microwave and about 50 wt % to about 80 wt % of synthetic rubber and (3) crosslinking the fluorocarbon rubber and the synthetic rubber.

In the method of preparing the rubber blend composition according to the present invention, step (2) may further include mixing about 20 parts by weight to about 40 parts by weight of a filler based on a total of 100 parts by weight of the fluorocarbon rubber and the synthetic rubber, and also mixing a crosslinking agent and an additive selected from the group of an antioxidant, an activator, a crosslinking accelerator and combinations thereof.

The ingredients of the rubber blend composition are described above, and a redundant description thereof is omitted herein.

As described above, in the preparation of the rubber blend composition by crosslinking the fluorocarbon rubber and the synthetic rubber having high freezing resistance according to the present invention, the fluorocarbon rubber is irradiated with a microwave so that the end group of the fluorocarbon rubber is radicalized, followed by crosslinking with the synthetic rubber, whereby a rubber blend composition having improved freezing resistance is obtained at low cost while overcoming the limitations of use of the fluorocarbon rubber.

In the present invention, the fluorocarbon rubber is irradiated with a microwave in order to form fluorocarbon rubber having a radicalized end group on a fluoroalkylene backbone, whereby the end group of the fluorocarbon rubber is activated by virtue of the energy of the microwave to thus drastically increase reactivity, as described above.

The microwave irradiation may be performed by applying a microwave of about 600 W to about 800 W (e.g., about 600 W, about 650 W, about 700 W, about 750 W, about 800 W, about 600 W to about 800 W, about 650 W to about 800 W, about 700 W to about 800 W, about 750 W to about 800 W, about 600 W to about 780 W, about 600 W to about 720 W, about 600 W to about 700 W, or about 600 W to about 650 W) to the fluorocarbon rubber for about 1 min to about 10 min (e.g., about 1 min, about 2 min, about 3 min, about 4 min, about 5 min, about 6 min, about 7 min, about 8 min, about 9 min, or about 10 min,). Under the above conditions, the end group of the fluorocarbon rubber may be radicalized.

A better understanding of the present invention will be given through the following Examples, which are merely set forth to illustrate, but are not to be construed as limiting the scope of the present invention.

EXAMPLES

Examples 1 to 3

Respective rubber blend compositions were prepared using ingredients in the amounts shown in Table 1 below.

Here, the fluorocarbon rubber was a tertiary copolymer comprising vinylidene fluoride (VF), hexafluoropropylene (HFP) and tetrafluoroethylene (TFE), and the synthetic rubber was hydrogenated nitrile butadiene rubber (HNBR).

Specifically, the fluorocarbon rubber was subjected to mastication for 5 min and then formed into a sheet. Thereafter, the fluorocarbon rubber was irradiated with a microwave of 700 W for about 2 min.

The microwave-irradiated fluorocarbon rubber was mixed with the synthetic rubber (in Example 1, the fluorocarbon rubber was used alone, without mixing with the synthetic rubber), and then added with carbon black (FEF grade) as a filler. Thereafter, a sulfur crosslinking agent, an antioxidant, an activator, and a crosslinking accelerator were mixed.

The obtained mixture was matured at room temperature for about 24 hr, fixed using a hydraulic press, and crosslinked at about 170° C. for an appropriate crosslinking time (a t'90 of each rubber (90% crosslinking time, min)), thus yielding a rubber blend composition.

Comparative Examples 1 to 3

Respective rubber blend compositions were prepared using ingredients in the amounts shown in Table 1 below. These rubber blend compositions were prepared in the same manner as in Examples 1 to 3, with the exception that irradiating the fluorocarbon rubber with a microwave was not performed.

Specifically, the fluorocarbon rubber was subjected to mastication for 5 min and then formed into a sheet. Thereafter, the fluorocarbon rubber was irradiated with a microwave of 700 W for about 2 min.

The microwave-irradiated fluorocarbon rubber was mixed with the synthetic rubber (in Example 4, the fluorocarbon rubber was used alone, without mixing with the synthetic rubber), and was then added with carbon black (FEF grade) as a filler. Thereafter, a sulfur crosslinking agent, an antioxidant, an activator, and a crosslinking accelerator were mixed.

TABLE 1

| | Items | C. Ex. 1 | C. Ex. 2 | C. Ex. 3 | Ex. 1 | Ex. 2 | Ex. 3 |
|---|---|---|---|---|---|---|---|
| Rubber [wt %] | Microwave irradiation time [min] | 0 | 0 | 0 | 2 | 2 | 2 |
| | Fluorocarbon rubber | 100 | 50 | 20 | 100 | 50 | 20 |
| | Synthetic rubber-HNBR | 0 | 50 | 80 | 0 | 50 | 80 |
| Filler [parts by weight] | Carbon black[1] | 30 | 30 | 30 | 30 | 30 | 30 |
| Antioxidant [parts by weight] | MB[2] | 1 | 1 | 1 | 1 | 1 | 1 |
| | 3C[3] | 1 | 1 | 1 | 1 | 1 | 1 |
| Activator [parts by weight] | ZnO | 5 | 5 | 5 | 5 | 5 | 5 |
| | Stearic acid | 1 | 1 | 1 | 1 | 1 | 1 |
| Crosslinking agent [parts by weight] | Sulfur | 1 | 1 | 1 | 1 | 1 | 1 |
| Crosslinking accelerator [parts by weight] | CZ[4] | 1 | 1 | 1 | 1 | 1 | 1 |
| | TR-10 [° C.][5] | −8 | −9 | −10 | −8 | −25 | −30 |

Note
[1] Carbon black: FEF grade carbon black, N550, particle size of 40 to 48 nm
[2] MB: 2-Mercaptobenzimidazole
[3] 3C: N-phenyl-N'-isopropyl-p-phenylenediamine
[4] CZ: N-cyclohexylbenzothiazole-2-sulfenamide
[5] Low-Temperature Retraction: TR-10 was measured in accordance with ASTM D1329.

As is apparent from Example 2, Comparative Example 2, Example 3 and Comparative Example 3 of Table 1, the rubber blend composition comprising the microwave-irradiated fluorocarbon rubber and the synthetic rubber exhibited superior freezing resistance compared to the conventional simple blend composition.

Examples 4 to 6

Respective rubber blend compositions were prepared using ingredients in the amounts shown in Table 2 below.

Here, the fluorocarbon rubber was a tertiary copolymer comprising vinylidene fluoride (VF), hexafluoropropylene (HFP) and tetrafluoroethylene (TFE), and the synthetic rubber was an ethylene-propylene-diene-monomer (EPDM).

The obtained mixture was matured at room temperature for about 24 hr, fixed using a hydraulic press, and crosslinked at about 170° C. for an appropriate crosslinking time (a t'90 of each rubber (90% crosslinking time, min)), thus yielding a rubber blend composition.

Comparative Examples 4 to 6

Respective rubber blend compositions were prepared using ingredients in the amounts shown in Table 2 below. These rubber blend compositions were prepared in the same manner as in Examples 4 to 6, with the exception that irradiating the fluorocarbon rubber with a microwave was not performed.

TABLE 2

| | Items | C. Ex. 4 | C. Ex. 5 | C. Ex. 6 | Ex. 4 | Ex. 5 | Ex. 6 |
|---|---|---|---|---|---|---|---|
| Rubber [wt %] | Microwave irradiation time [min] | 0 | 0 | 0 | 2 | 2 | 2 |
| | Fluorocarbon rubber | 100 | 50 | 20 | 100 | 50 | 20 |
| | Synthetic rubber-EPDM | 0 | 50 | 80 | 0 | 50 | 80 |
| Filler [parts by weight] | Carbon black[1] | 30 | 30 | 30 | 30 | 30 | 30 |
| Antioxidant [parts by weight] | MB[2] | 1 | 1 | 1 | 1 | 1 | 1 |
| | 3C[3] | 1 | 1 | 1 | 1 | 1 | 1 |
| Activator [parts by weight] | ZnO | 5 | 5 | 5 | 5 | 5 | 5 |
| | Stearic acid | 1 | 1 | 1 | 1 | 1 | 1 |
| Crosslinking agent [parts by weight] | Sulfur | 1 | 1 | 1 | 1 | 1 | 1 |

TABLE 2-continued

| Items | | C. Ex. 4 | C. Ex. 5 | C. Ex. 6 | Ex. 4 | Ex. 5 | Ex. 6 |
|---|---|---|---|---|---|---|---|
| Crosslinking accelerator [parts by weight] | CZ[4] | 1 | 1 | 1 | 1 | 1 | 1 |
| | TR-10 [° C.][5] | −8 | −9 | −10 | −8 | −22 | −31 |

Note
[1]Carbon black: FEF grade carbon black, N550, particle size of 40 to 48 nm
[2]MB: 2-Mercaptobenzimidazole
[3]3C: N-phenyl-N'-isopropyl-p-phenylenediamine
[4]CZ: N-cyclohexylbenzothiazole-2-sulfenamide
[5]Low-Temperature Retraction: TR-10 was measured in accordance with ASTM D1329.

As is apparent from Example 4, Comparative Example 4, Example 5 and Comparative Example 5 of Table 2, the rubber blend composition comprising the microwave-irradiated fluorocarbon rubber and the synthetic rubber exhibited superior freezing resistance compared to the conventional simple blend composition.

As described hereinbefore, the present invention has been described in detail with respect to experimental examples and embodiments. However, the scope of the present invention is not limited to the above-described experimental examples and examples, and various modifications and improved modes of the present invention using the basic concept of the present invention defined in the accompanying claims are also incorporated in the scope of the present invention.

According to the present invention, the rubber blend composition having improved freezing resistance can be utilized for an oil seal of a vehicle, suitable for use in a power steering system, an engine cylinder block, a front cover gasket, a cooling water controller, an air conditioner, etc.; a fuel filter seal; a fuel injector O-ring; a fuel rail seal; a fuel tank valve seal; a fuel sender seal; a fuel cap seal; a quick connect O-ring; a filter neck hose; a fuel vapor line; a fuel return line and the like.

The rubber blend composition according to the present invention is not limited to the above listed use examples, and may be applied to any component that requires air tightness.

Also, in the present invention, the process of blending the fluorocarbon rubber having the radicalized end group with another rubber material can be used as original technology for improving the physical and chemical properties of fluorocarbon rubber.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rubber blend composition having improved freezing resistance, comprising:
   about 20 wt % to about 50 wt % of a fluorocarbon rubber having a radicalized end group on a fluoroalkylene backbone; and
   about 50 wt % to about 80 wt % of a synthetic rubber.

2. The rubber blend composition of claim 1, wherein the fluorocarbon rubber and the synthetic rubber are crosslinked.

3. The rubber blend composition of claim 1, wherein the fluorocarbon rubber is selected from the group consisting of vinylidene fluoride (VF), hexafluoropropylene (HFP), tetrafluoroethylene (TFE), perfluoromethylvinylether (PMVE), and combinations thereof.

4. The rubber blend composition of claim 1, wherein the fluorocarbon rubber is selected from the group consisting of a binary copolymer of vinylidene fluoride (VF) and hexafluoropropylene (HFP); a tertiary copolymer of vinylidene fluoride (VF), tetrafluoroethylene (TFE) and perfluoromethylvinylether (PMVE); a tertiary copolymer of vinylidene fluoride (VF), hexafluoropropylene (HFP) and tetrafluoroethylene (TFE); and combinations thereof.

5. The rubber blend composition of claim 1, wherein the fluorocarbon rubber contains about 65 wt % to about 70 wt % of fluorine.

6. The rubber blend composition of claim 1, wherein the synthetic rubber is selected from the group consisting of hydrogenated nitrile butadiene rubber (HNBR), nitrile butadiene rubber (NBR), an ethylene-propylene-diene-monomer (EPDM), acrylate rubber (ACM), acrylate ethylene rubber (AEM), an ethylene-vinyl acetate copolymer (EVA), and combinations thereof.

7. The rubber blend composition of claim 1, further comprising, based on a total of 100 parts by weight of the fluorocarbon rubber and the synthetic rubber, 20 parts by weight to 40 parts by weight of a filler.

8. The rubber blend composition of claim 1, further comprising a crosslinking agent and an additive selected from the group consisting of an antioxidant, an activator, a crosslinking accelerator, and combinations thereof.

9. The rubber blend composition of claim 1, wherein the rubber blend composition has a TR-10 of −25° C. to −30° C. in accordance with ASTM D1329.

10. A method of preparing a rubber blend composition having improved freezing resistance comprising:
   (1) irradiating a fluorocarbon rubber having a fluoroalkylene backbone with a microwave, thus radicalizing an end group of the fluorocarbon rubber;
   (2) mixing about 20 wt % to about 50 wt % of the fluorocarbon rubber irradiated with the microwave and about 50 wt % to about 80 wt % of a synthetic rubber; and
   (3) crosslinking the fluorocarbon rubber and the synthetic rubber.

11. The method of claim 10, wherein the fluorocarbon rubber is selected from the group consisting of vinylidene fluoride (VF), hexafluoropropylene (HFP), tetrafluoroethylene (TFE), perfluoromethylvinylether (PMVE), and combinations thereof.

12. The method of claim 10, wherein the fluorocarbon rubber is selected from the group consisting of a binary copolymer of vinylidene fluoride (VF) and hexafluoropropylene (HFP); a tertiary copolymer of vinylidene fluoride (VF), tetrafluoroethylene (TFE) and perfluoromethylvinylether (PMVE); a tertiary copolymer of vinylidene fluoride (VF), hexafluoropropylene (HFP) and tetrafluoroethylene (TFE); and combinations thereof.

13. The method of claim 10, wherein the fluorocarbon rubber contains about 65 wt % to about 70 wt % of fluorine.

14. The method of claim 10, wherein the irradiating with the microwave is performed by applying a microwave of about 600 W to about 800 W to the fluorocarbon rubber for about 1 min to about 10 min.

15. The method of claim 10, wherein the synthetic rubber is selected from the group consisting of hydrogenated nitrile butadiene rubber (HNBR), nitrile butadiene rubber (NBR), an ethylene-propylene-diene-monomer (EPDM), acrylate rubber (ACM), acrylate ethylene rubber (AEM), an ethylene-vinyl acetate copolymer (EVA) and combinations thereof.

16. The method of claim 10, wherein step (2) further comprises mixing a filler in an amount of about 20 parts by weight to about 40 parts by weight based on a total of 100 parts by weight of the fluorocarbon rubber and the synthetic rubber.

17. The method of claim 10, wherein step (2) further comprises mixing a crosslinking agent and an additive selected from the group consisting of an antioxidant, an activator, a crosslinking accelerator, and combinations thereof.

18. The method of claim 10, wherein the rubber blend composition has a TR-10 of −25° C. to −30° C. in accordance with ASTM D1329.

\* \* \* \* \*